May 26, 1931.  C. W. ROSS, JR  1,806,710
PIPE JOINT
Filed June 22, 1928
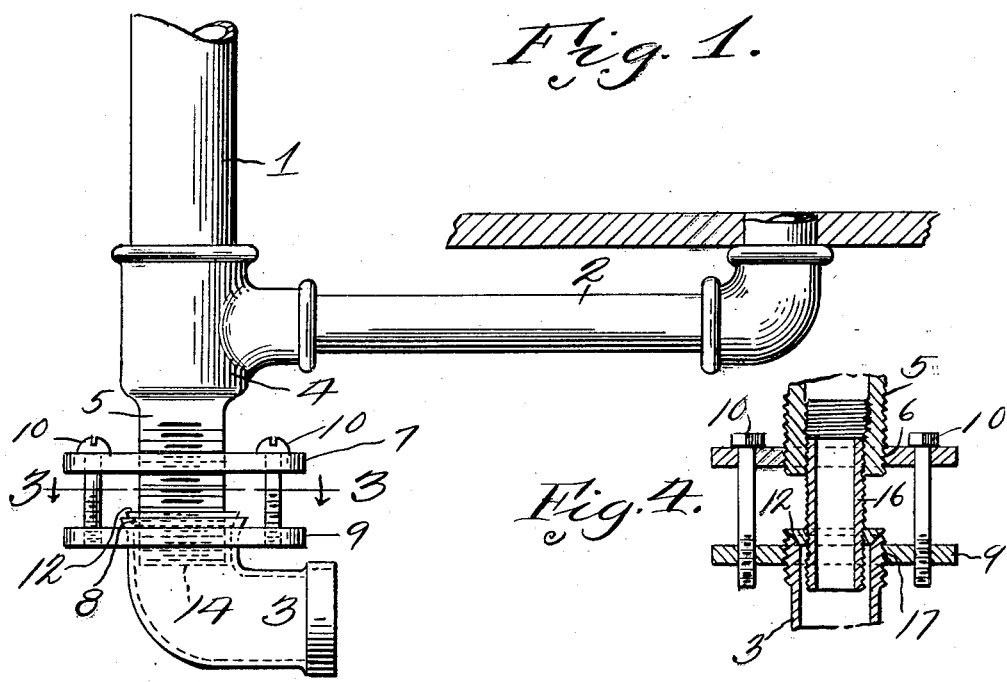
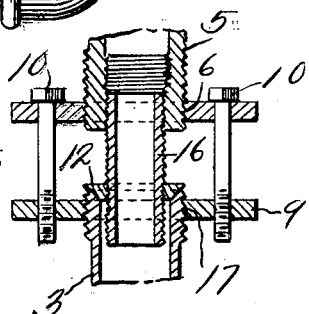
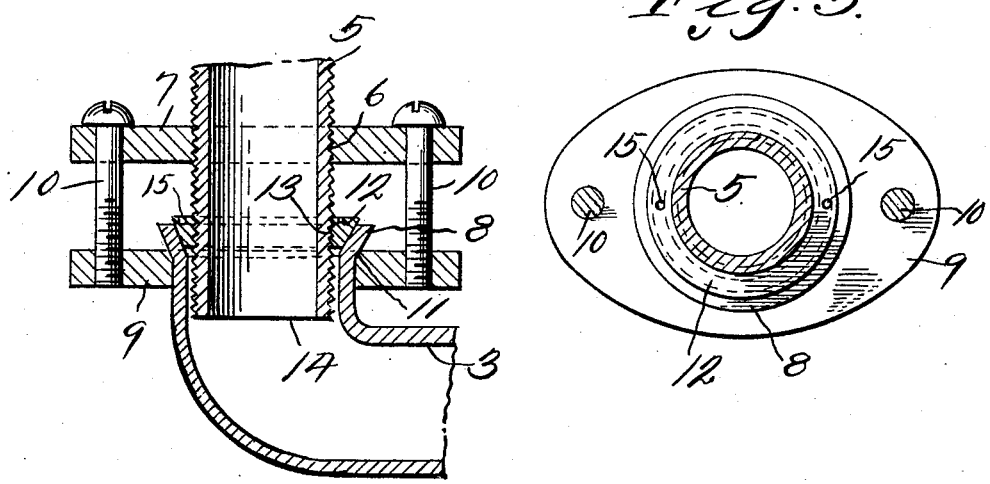
Inventor
Charles W. Ross, Jr.
By Philip A. H. Ferrell
Attorney Patented May 26, 1931

1,806,710

UNITED STATES PATENT OFFICE

CHARLES W. ROSS, JR., OF NEW ORLEANS, LOUISIANA

PIPE JOINT

Application filed June 22, 1928. Serial No. 287,421.

The invention relates to pipe joints and particularly to a pipe joint which can be easily and quickly adjusted and adapted for use in connection with bath fittings for eliminating the usual soldered connection between the fittings and the pipe leading to a conventional drum trap.

A further object is to provide a pipe joint comprising a threaded pipe end having threaded thereon a bolt receiving flange, which threaded pipe end extends into the end of another pipe and has also threaded thereon a tapered ring seated in the flared portion of the last named pipe end, and a flange carried by the last named pipe end and having bolt connections with the named flange, whereby the flared end of the pipe may be forced into binding water tight engagement with the tapered ring. The tapered ring and flange form means whereby the pipe ends may be adjusted in relation to each other according to adjacent pipe and fitting and allows easy disconnection for repair purposes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of the pipe connection applied to a conventional bath fixture.

Figure 2 is a vertical longitudinal sectional view through the pipe connection.

Figure 3 is a horizontal sectional view taken on line 3—3 of Figure 1.

Figure 4 is a vertical longitudinal sectional view through a modified form of connector.

Referring to the drawings, the numeral 1 designates the conventional bath waste pipe and 2 the drain pipe, which discharge into the fitting 3 leading to the conventional form of trap. The usual connection at present used is a lead pipe which is soldered to the lower end of the waste pipe 1, and which has been found to be an extremely expensive structure, as it is a soldered connection, requiring considerable skill to form and properly adjust in relation to pipe ends. Where a soldered connection is used, the joint can not be easily and quickly broken for repair purposes and to overcome the above difficulties the fitting 4 carried by the waste pipe 1 is provided with a threaded extension 5, which extension extends downwardly into the L fitting 3, as clearly shown in Figure 2.

Threaded at 6 on the pipe extension 5 is a flange 7, which flange may be adjusted upwardly and downwardly as desired in relation to the flared end 8 of the pipe fitting 3, and extending through the flange 7 and a flange 9 carried by the fitting 3, are bolts 10, which bolts when tightened force the flange 9 upwardly until its bevelled edge 11 engages the outer periphery of the flared end 8 of the pipe connection 4 and forces the same inwardly into close binding engagement with the annular bevelled ring 12 which is threaded at 13 on the lower end of the pipe 5, thereby forming a close water tight connection. By adjusting the flange 7 and the bevelled ring 12 in relation to the lower end 14 of the threaded extension 5, it is obvious that the fitting 3 may be adjusted to any desired position upwardly or downwardly according to adjacent pipe connections, therefore it will be seen that the connection will adapt itself to various conditions and variations incident to installation of devices of this character. It will be seen that when it is desired to break the joint for repair purposes, it will only be necessary for the operator to remove the screws 10 and force the flange 9 downwardly after which the threaded ring 12 may be threaded upwardly on the extension 5. If desired the ring 12 may be provided with apertures 15 for the reception of a spanner wrench, however applicant does not limit himself in this particular. Although the device is described in connection with a bath fitting, to which it is particularly adapted, it is to be understood that it may be applied as a connector between pipes generally.

Referring to the modified form shown in

Figure 4, the structure and operation is substantially the same as shown in Figure 2, with the exception that the threaded nipple 16 is threaded into the pipe 5, and the lower flange 9 is threaded at 17 onto the pipe fitting 3, and by which particular construction a wider range of adjustability is provided, and the necessity of flaring the end 8 of the pipe fitting 3 is obviated.

From the above it will be seen that a pipe connection is provided which is simple in construction, adjustable, and one which may be easily and quickly adjusted for repair purposes. It will also be seen that a jamming action is used for seating the bevelled ring 12 in the flared pipe end 8, and if desired said pipe fitting 3 may be formed from lead or other material.

The invention having been set forth what is claimed as new and useful is:

1. The combination with a bath waste pipe, a trap lead fitting having a portion axially related to the waste pipe and into which the waste pipe extends, said waste pipe being threaded, said axial portion of the trap lead fitting having a flange axially movable thereon and provided with a bevelled edge, said axial portion of the trap lead fitting being flared and in the path of the bevelled edge of the axially movable flange, a bevelled ring threaded on the waste pipe and disposed within the flared portion of the trap lead fitting, a flange threaded on the waste pipe above the ring and bolts extending through both of said flanges and forming means whereby the bevelled ring is maintained in water tight engagement within the flared portion of the trap lead fitting.

2. A pipe connection comprising a pipe having a threaded end, a pipe having a flared end and into which the threaded pipe extends, a flange slidably mounted on the end of the flared pipe, a ring threaded on the threaded pipe and disposed within the flared pipe and adapted to seat therein, a flange threaded on the threaded pipe and bolts connecting both of said flanges.

3. A pipe connection comprising a threaded pipe end, a flared pipe end, a bevelled ring threaded on the threaded pipe end and disposed within the flared pipe end, a flange slidably mounted on the flared pipe end and cooperating with said end for contracting the same against the bevelled ring, a flange threaded on the threaded pipe end, and bolts extending through both of said flanges.

4. The combination with axially alined pipe ends extending into each other, of a connection between said pipe ends, said connection comprising a flange slidably mounted on one of said pipe ends, said flange forming means for contracting a flared end of said pipe end, a flange threaded on the other pipe end, bolts connecting said flanges, and a bevelled ring threaded on the last named pipe end and disposed in engagement with the inner periphery of the flared pipe end.

In testimony whereof I hereunto affix my signature.

CHARLES W. ROSS, Jr.